(12) United States Patent
Vater et al.

(10) Patent No.: US 8,457,302 B1
(45) Date of Patent: Jun. 4, 2013

(54) ACCESS-CONTROLLED DATA STORAGE MEDIUM

(75) Inventors: Harald Vater, Giessen (DE); Hermann Drexler, Munich (DE); Eric Johnson, Munich (DE)

(73) Assignee: Giesecke & Devrient GmbH, München (DE)

( * ) Notice: Subject to any disclaimer, the term of this patent is extended or adjusted under 35 U.S.C. 154(b) by 0 days.

(21) Appl. No.: 09/700,656

(22) PCT Filed: May 17, 1999

(86) PCT No.: PCT/EP99/03385
§ 371 (c)(1),
(2), (4) Date: Feb. 14, 2001

(87) PCT Pub. No.: WO99/60534
PCT Pub. Date: Nov. 25, 1999

(30) Foreign Application Priority Data

May 18, 1998 (DE) .................. 198 22 217
May 18, 1998 (DE) .................. 198 22 218
May 18, 1998 (DE) .................. 198 22 220

(51) Int. Cl.
H04L 9/00 (2006.01)
H04L 9/28 (2006.01)
H04K 1/00 (2006.01)
G06F 12/14 (2006.01)

(52) U.S. Cl.
USPC .................. 380/1; 380/28; 713/193

(58) Field of Classification Search
USPC .......... 726/26; 380/252, 1, 28; 713/193, 713/189, 190, 200
See application file for complete search history.

(56) References Cited

U.S. PATENT DOCUMENTS

| | | | | |
|---|---|---|---|---|
| 4,908,038 A * | 3/1990 | Matsumura et al. | .......... | 235/380 |
| 4,932,053 A * | 6/1990 | Fruhauf et al. | .......... | 380/252 |
| 5,003,596 A * | 3/1991 | Wood | .......... | 380/28 |
| 5,016,274 A * | 5/1991 | Micali et al. | .......... | 705/66 |
| 5,168,521 A * | 12/1992 | Delaporte et al. | .......... | 380/29 |
| 5,297,201 A * | 3/1994 | Dunlavy | .......... | 380/252 |
| 5,307,411 A * | 4/1994 | Anvret et al. | .......... | 713/169 |
| 5,606,616 A * | 2/1997 | Sprunk et al. | .......... | 380/29 |
| 5,655,023 A * | 8/1997 | Cordery et al. | .......... | 380/51 |
| 5,991,415 A * | 11/1999 | Shamir | .......... | 380/30 |
| 6,049,613 A * | 4/2000 | Jakobsson | .......... | 380/47 |
| 6,061,449 A * | 5/2000 | Candelore et al. | .......... | 380/28 |

(Continued)

FOREIGN PATENT DOCUMENTS

| | | | |
|---|---|---|---|
| EP | 368596 A2 * | 5/1990 | |
| EP | 538216 A1 * | 4/1993 | |
| WO | WO 9103113 A * | 3/1991 | |

OTHER PUBLICATIONS

Schneier, Bruce. Applied Cryptography, Second Edition: Protocols, Algorithms, and Source Code in C. John Wiley & Sons, Inc., 1996. pp. 13-17.*

*Primary Examiner* — Zachary A Davis
(74) *Attorney, Agent, or Firm* — Bacon & Thomas, PLLC

(57) ABSTRACT

The invention relates to a data carrier (1) having a semiconductor chip (5). In order to prevent an attacker from determining secret data of the chip (5) from intercepted signal patterns of the chip (5), security-relevant operations are performed only with commands or command strings of the operating program whose use does not permit the processed data to be inferred from the signal patterns.

9 Claims, 4 Drawing Sheets

U.S. PATENT DOCUMENTS

| | | | | |
|---|---|---|---|---|
| 6,069,954 A * | 5/2000 | Moreau | | 380/28 |
| 6,122,742 A * | 9/2000 | Young et al. | | 726/10 |
| 6,304,658 B1 * | 10/2001 | Kocher et al. | | 380/30 |
| 6,337,909 B1 * | 1/2002 | Vanstone et al. | | 380/28 |
| 6,373,946 B1 * | 4/2002 | Johnston | | 380/211 |
| 6,615,354 B1 * | 9/2003 | Ohki et al. | | 713/193 |
| 6,631,471 B1 * | 10/2003 | Ohki et al. | | 713/193 |
| 7,372,961 B2 * | 5/2008 | Vanstone et al. | | 380/44 |
| 7,447,913 B2 * | 11/2008 | Drexler et al. | | 713/189 |
| 7,506,165 B2 * | 3/2009 | Kocher et al. | | 713/194 |
| 2002/0124178 A1 * | 9/2002 | Kocher et al. | | 713/193 |
| 2008/0104400 A1 * | 5/2008 | Kocher et al. | | 713/172 |

* cited by examiner

ACCESS-CONTROLLED DATA STORAGE MEDIUM

BACKGROUND OF THE INVENTION

1. Field of the Invention

This invention relates to a data carrier having a semiconductor chip in which secret data are stored. The invention relates in particular to a smart card.

2. Description of Related Art

Data carriers containing chips are used in a great number of different applications, for example for performing monetary transactions, paying for goods or services or as identification means for access or admission controls. In all such applications the chip of the data carrier normally processes secret data which must be protected from access by unauthorized third parties. Such protection is ensured by, among other things, giving the inner structures of the chip very small dimensions so that it is very difficult to access said structures with the aim of spying out data processed in said structures. In order to impede access further, the chip can be embedded in a very firmly adhering mass whose forcible removal destroys the semiconductor plate or at least the secret data stored therein. It is likewise possible to provide the semiconductor plate during its production with a protective layer which cannot be removed without destroying the semiconductor plate.

With corresponding technical equipment, which is extremely expensive but nevertheless fundamentally available, an attacker could possibly succeed in exposing and examining the inner structure of the chip. Exposure could be effected for example by special etching methods or a suitable grinding process. The thus exposed structures of the chip, such as conductive paths, could be contacted with microprobes or examined by other methods to determine the signal patterns in said structures. Subsequently one could attempt to determine from the detected signals secret data of the data carrier, such as secret keys, in order to use them for purposes of manipulation. One could likewise attempt to selectively influence the signal patterns in the exposed structures via the microprobes.

U.S. Pat. No. 4,932,053 discloses a data carrier with semiconductor chips which has at least one memory in which an operating program containing a plurality of commands is stored. Each command causes signals detectable from outside the semiconductor chip. The signals are measured by current consumption at the terminals of the integrated circuit, permitting the processed data to be inferred. To prevent reading, a protection circuit is provided which generates a pseudorandom sequence by means of simulation cells. The current behavior which is measurable from outside is thus superimposed with a random signal.

French laid-open print FR-A-2 745 924 discloses making signals unrecognizable by using for a random generator which leads to desynchronization during execution of instruction sequences or program sequences within the processor.

SUMMARY OF THE INVENTION

The invention is based on the problem of protecting secret data present in the chip of a data carrier from unauthorized access.

This problem is solved by limiting the semiconductor chip of a data carrier to executing operating program commands of a such a kind, or executing the commands in such a way, that the data processed with the corresponding commands cannot be inferred from signals detectable from outside the semiconductor chip.

The inventive solution, unlike the prior art, involves no measures to prevent exposure of the internal structures of the chip and the mounting of microprobes. Instead measures are taken to make it difficult for a potential attacker to infer secret information from any intercepted signal patterns. The signal patterns depend on the operations which the chip is performing. Said operations are controlled with the aid of an operating program stored in a memory of the chip. The operating program is composed of a series of individual commands each triggering an exactly specified operation. So that the chip can perform the intended functions a corresponding command string is to be defined for each of said functions. Such a function can be for example the encryption of data with the aid of a secret key. To give an attacker intercepting the processes on the chip by microprobes he has mounted as little information as possible about the particular commands executed and the data used in executing the commands, a desired function is preferably realized using commands of such a kind, or using commands in such a way, that it is difficult if not impossible to spy out information. In other words, no commands or command strings are to be used which allow the processed data to be inferred in a simple way by interception.

It is always especially easy to infer data when a command processes very few data, for example one bit. For this reason one preferably uses commands, according to an embodiment of the invention, which simultaneously process a plurality of bits, e.g. one byte, at least for all security-relevant operations, such as encryption of data. Such simultaneous processing of a plurality of bits blurs the influence the individual bits have on the signal pattern caused by the command into a total signal from which it is very difficult to infer the individual bits. The signal pattern is much more complex than in the processing of individual bits and it is not readily evident which part of the signal belongs to which bit of the processed data.

Additionally or alternatively, one can impede an attack on the processed data according to the invention by using in security-relevant operations solely commands which trigger an identical or very similar signal pattern or commands by which the processed data have very little or no influence on the signal pattern.

According to another advantageous embodiment of the invention, one performs security-relevant operations not with authentic secret data but with falsified secret data from which the authentic secret data cannot be determined without the addition of further secret information. This means that even if an attacker succeeds in determining the secret data used in an operation, he cannot cause any damage since the spied-out data are not the authentic secret data but falsified secret data.

In order to guarantee the functioning of the data carrier one must ensure that the data carrier delivers the right results when rightfully used despite the falsified secret data. This is obtained by first specifying a function for falsifying the authentic secret data, for example XORing the secret data with a random number. The authentic secret data are falsified with the thus specified function. The falsified secret data are used to perform all those operations in the data carrier for which falsification of the secret data can subsequently be compensated. In the case of XOR-falsified secret data, these would be operations which are linear with respect to XOR operations. Before execution of an operation not permitting such compensation, for example an operation which is non-linear with respect to XOR operations, the authentic secret data must be restored so that said operation is performed with the authentic secret data. The authentic secret data are restored after execution of a compensable function for example by XORing the function value determined by means of the falsified secret data with a corresponding function value of the random number used for falsification. It is important in this context for the random number and function value to be previously determined and stored in safe surroundings so that the calculation of the function value from the random number cannot be intercepted.

The above procedure means that the authentic secret data are used only for performing operations, such as nonlinear operations, for which this is absolutely necessary, i.e. which cannot be performed alternatively with falsified secret data. Since such operations are normally very complex and not easy to analyze, it is extremely difficult if not impossible for a potential attacker to find out the authentic secret data from analyzing the signal patterns caused by said operations. Since the simply structured functions permitting subsequent compensation of falsification are performed with falsified secret data, the described procedure makes it extremely difficult to determine the authentic secret data of the data carrier from illegally intercepted signal patterns.

The signal patterns depend on the operations which the chip is executing. If said operations are always executed according to the same rigid pattern, i.e. in particular in the same order, and the attacker knows this order, an attacker need overcome much fewer difficulties to spy out data than if he does not even know which operation is being executed at which time. It is therefore provided according to a further embodiment of the invention to move as far away as possible from a rigid flow pattern when executing security-relevant operations within the smart card, thereby offering the attacker next to no hints for analyzing the secret data. This is obtained by executing as many operations as possible, ideally even all operations, which are independent of each other insofar as each of the operations requires no data determined by the other operations, in a variable order, for example one that is random or dependent on input data. This achieves the result that an attacker, who will normally be oriented by the order of the operations, cannot readily find out which operation is being executed. This holds especially when the operations resemble each other very strongly or are even the same with respect to the signal pattern they cause with the same input data. If the attacker does not even know the kind of operation which is being executed, it is extremely difficult to spy out data selectively. If there is the danger of an attacker making a great number of spying attempts in order to average out the random variation of the order, it is recommendable to make the variation dependent on the input data.

BRIEF DESCRIPTION OF THE DRAWINGS

The invention will be explained below with reference to the embodiments shown in the figures, in which.

DETAILED DESCRIPTION OF THE PREFERRED EMBODIMENTS

Figure 1:
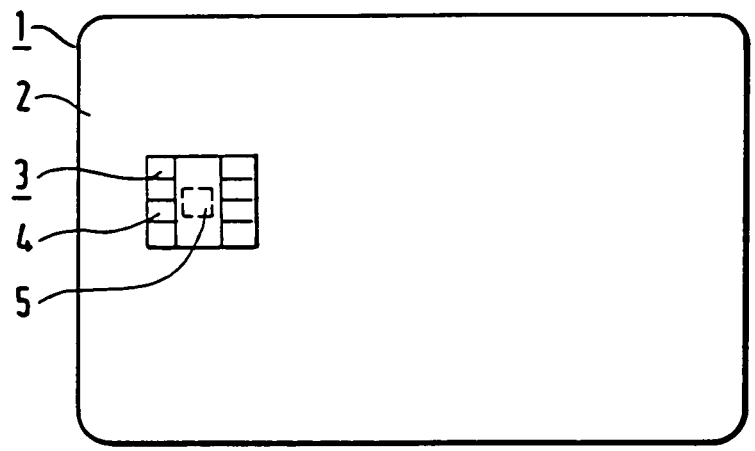
FIG. 1 shows a smart card from the front.

FIG. 1 shows smart card 1 as an example of the data carrier. Smart card 1 is composed of card body 2 and chip module 3 set in a specially provided gap in card body 2. Essential components of chip module 3 are contact surfaces 4 via which an electric connection can be made with an external device, and chip 5 electrically connected with contact surfaces 4. Alternatively or in addition to contact surfaces 4, a coil not shown in FIG. 1 or other transfer means can be present for producing a communication link between chip 5 and an external device.

Figure 2:
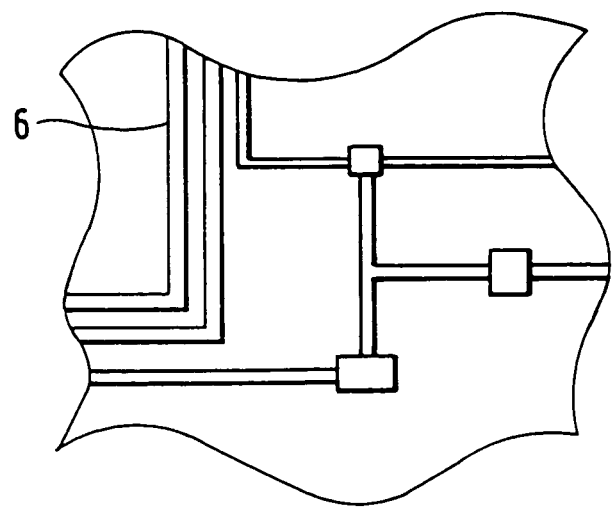
FIG. 2 shows a greatly enlarged detail of the chip of the smart card shown in FIG. 1 from the front.

FIG. 2 shows a greatly enlarged detail of chip 5 from FIG. 1 from the front. The special feature of FIG. 2 is that it shows the active surface of chip 5, i.e. FIG. 2 omits all layers which generally protect the active layer of chip 5. In order to obtain information about the signal patterns inside the chip one can for example contact exposed structures 6 with microprobes. The microprobes are very thin needles which are brought in electric contact with exposed structures 6, for example conductive paths, by means of a precision positioning device. The signal patterns picked up by the microprobes are processed with suitable measuring and evaluation devices in order to infer secret data of the chip.

The invention achieves the result that an attacker cannot gain access, or only with great difficulty, to in particular secret data of the chip even if he succeeds in removing the protective layer of chip 5 without destroying the circuit and contacting exposed structures 6 of chip 5 with microprobes or otherwise intercepting them. The invention is of course also effective if an attacker gains access to the signal patterns of chip 5 in another way.

According to the invention, the commands or command strings of the operating program of the chip are selected at least in all security-relevant operations in such a way that the data processed with the commands can either not be inferred at all or at least only with great difficulty from the intercepted signal patterns.

This can be achieved for example by fundamentally using in security operations no commands which process individual bits, such as the shift of individual bits, intended to cause a permutation of the bits of a bit string. Instead of bit commands one can use for example byte commands such as copy or rotation commands which process not an individual bit but a whole byte comprising eight bits. The byte command triggers a much more complex signal pattern than the bit command, it being extremely difficult to associate individual bits with partial areas of the signal pattern. This blurs the information processed with the byte command, making it difficult to spy out said information.

Further, the invention offers the possibility of fundamentally using in security-relevant operations only commands triggering a very similar signal pattern so that it is very difficult to differentiate the commands being executed by the signal patterns. It is likewise possible to design the commands so that the kind of processed data has very little or no influence on the signal pattern triggered by the command.

The described variants can be used either alternatively or in combination with respect to the individual commands. An inventive set of security-relevant commands can thus be composed of commands belonging to one or more of the above-mentioned variants. One can likewise use an instruction set in which all commands belong to the same variant, it also being allowed that some or all commands belong to other variants as well. For example, one can allow solely byte commands, preferably using those commands which in addition trigger a very similar signal pattern.

Security-relevant operations include e.g. encryption operations which are frequently used in smart cards. Such encryptions involve execution of a series of single operations which lead to bit-by-bit changes in a data word. According to the invention all these commands are replaced with byte commands and/or the abovementioned inventive measures are taken. This makes it even more difficult for an attacker to infer the secret keys used in encryption from the intercepted signal patterns, thereby preventing abuse of said secret keys.

Figure 3:
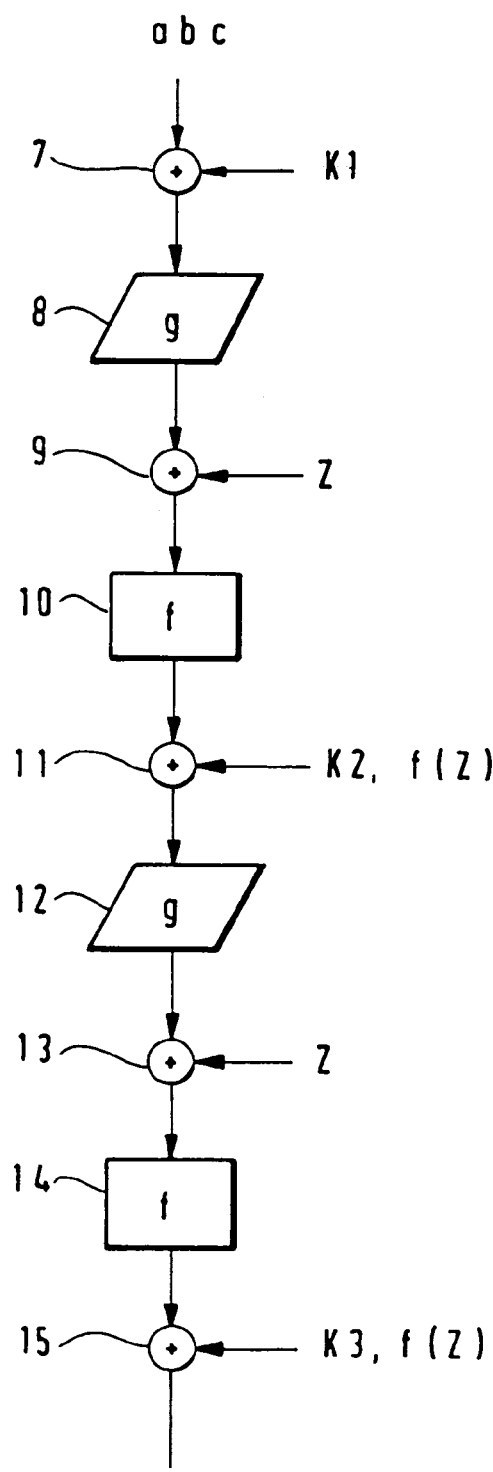
FIG. 3 shows a schematic representation of part of an operational sequence within the smart card.

FIG. 3 shows a schematic representation of part of an operational sequence in the smart card. An encryption operation was selected for the representation by way of example. However, the principles explained by this example are also applicable to any other security-relevant operations. At the onset of the part of the encryption operation shown in FIG. 3, data abc, which can be present in plaintext or already encrypted, are supplied to logic point 7. At logic point 7 data abc are combined with key K1. In the present example this combination is an XOR operation but other suitable forms of combination can also be used. Nonlinear function g is then applied to the result of the combination in function block 8. In order to show that function block 8 represents a nonlinear function it has the form of a distorted rectangle in FIG. 3. The data produced with function block 8 are XORed with random number Z at logic point 9 and subsequently processed in function block 10. Combination with random number Z causes falsification of the data which makes it difficult for an attacker to analyze the processes in function block 10 representing a linear mapping by means of function $f$. an undistorted rectangle is used as a symbol of a linear function in FIG. 3. The data produced in function block 10 are combined at logic point 11 with data $f(Z)$ previously generated e.g. during production of the card by application of function $f$ to random number Z. This combination compensates for the falsification of the data with random number Z at logic point 9. Said compensation is necessary since nonlinear function g is subsequently to be applied to the data in function block 12 and compensation of falsification is no longer possible after application of a nonlinear function to the data. Further, the data are XORed at logic point 11 with key K2 which is necessary in connection with the encryption operation.

The combination at logic point 11 with the data $f(Z)$ and K2 can be effected either with single components K2 and $f(Z)$ or with the result of an XOR operation of said components. The latter procedure opens up the possibility of key K2 not needing to be available in plaintext but only key K2 XORed with $f(Z)$. If this combination value was calculated and stored in the memory of the card previously, e.g. during initialization or personalization of smart card 1, it is unnecessary to store key K2 in smart card 1 in plaintext. This further increases the security of smart card 1.

After application of function g to the data in function block 12 the thus determined result is in turn combined with random number Z at logic point 13 and thereby falsified. Linear function $f$ is then applied to the result of the combination in function block 14. Finally, the data are XORed with the result of an application of function $f$ to random number Z and with key K3 at logic point 15. This operation can be followed by further processing steps not shown in FIG. 3.

All in all, the procedure shown in FIG. 3 can be summarized by saying that the data processed in the encryption operation are falsified whenever possible by XORing with random number Z in order to prevent secret data from being spied out. Falsification is fundamentally possible with all functions $f$ showing linear behavior with respect to XOR operations. With nonlinear functions g the unfalsified data must be used. It is therefore necessary that the falsification be compensated by XORing the data with function value $f(Z)$ before application of nonlinear function g to the data. It is less critical from a security point of view that nonlinear functions g can only be applied to the unfalsified data since said nonlinear functions g are much more difficult to spy out than linear functions $f$ the diagram shown in FIG. 3 is applicable both for identical functions g or functions $f$ and for different respective functions.

The diagram shown in FIG. 3 achieves the result that it is almost impossible to spy out secret data during the processing of data abc. However, since upon provision of secret keys K1, K2 and K3 operations are also to be executed with said keys which could in turn be the target of a spying attempt by an attacker, it is recommendable to take corresponding safety precautions in the processing of the keys. An embodiment of the invention involving such safety precautions is shown in FIG. 4.

Figure 4:
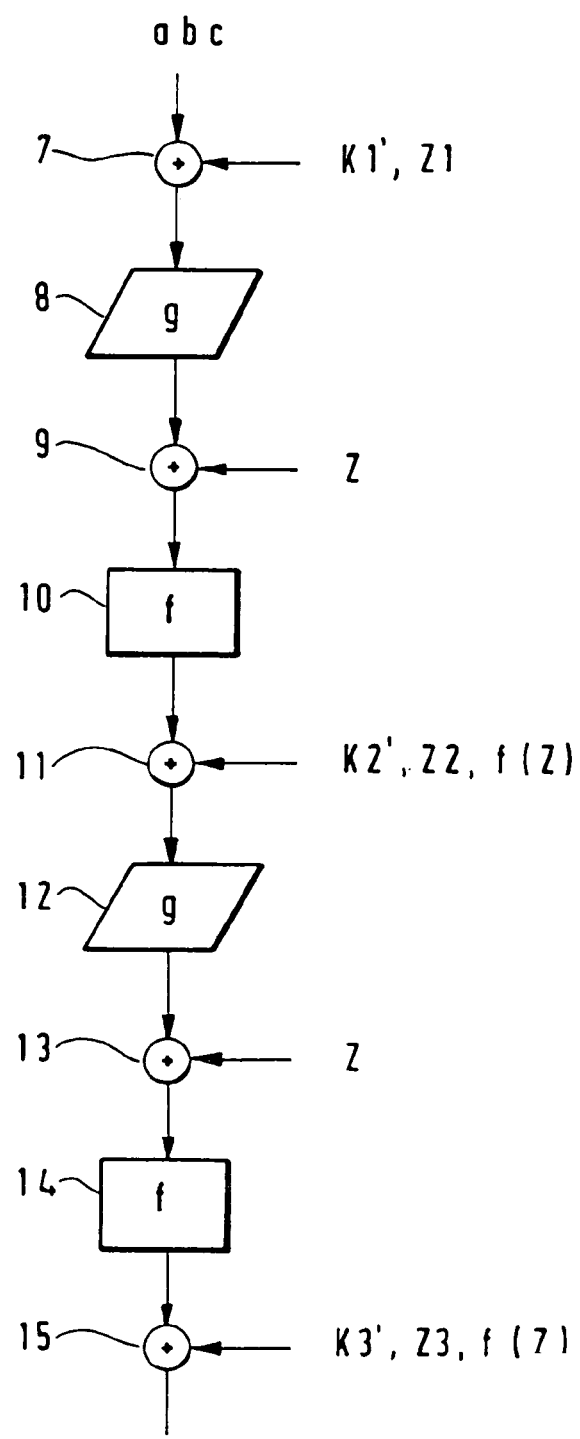
FIG. 4 shows a variant of the operational sequence shown in FIG. 3.

FIG. 4 shows a part corresponding to FIG. 3 of an operational sequence of a smart card for a further variant of the invention. Processing of data abc is identical to FIG. 3 and will therefore not be explained again in the following. In contrast to FIG. 3, however, keys K1, K2 and K3 are not supplied to logic points 7, 11 and 15 in FIG. 4. Instead, falsified keys K1', K2' and K3' are supplied together with random numbers Z1, Z2 and Z3 required for compensating falsification, the falsified keys preferably being supplied first and then the random numbers. This ensures that proper keys K1, K2 and K3 do not appear at all. This procedure is especially advantageous in encryption methods by which keys K1, K2 and K3 are derived from common key K. In this case key K falsified with random number Z is stored in smart card 1, and random numbers Z1, Z2 and Z3 determined by application of the key derivation method to random number Z are stored in smart card 1. Storage must be done in safe surroundings, for example in the personalization phase of smart card 1.

For carrying out the functional diagram shown in FIG. 4 one requires not only the stored data but also falsified derived keys K1', K2' and K3'. Said keys can be derived from falsified key K when they are required. With this procedure no operations are performed with authentic key K or authentic derived keys K1, K2 and K3 so that it is virtually impossible to spy out said keys. Since derived random numbers Z1, Z2 and Z3 were also determined and stored in smart card 1 in advance, no more operations are performed therewith which could be spied out by an attacker. Thus, no access is possible to authentic derived keys K1, K2 and K3 by spying out falsified derived keys K1', K2' and K3' since this requires derived random numbers Z1, Z2 and Z3.

In order to increase security further it is also possible to use a different random number Z for each EXOR operation, making sure that an $f(Z)$ is then also present for compensating the falsification in each case. In one embodiment, all random numbers Z and function values $f(Z)$ are stored in the memory of the smart card. However, it is likewise possible to store only a small number of random numbers Z and function values $f(Z)$ and determine new random numbers Z and function values $f(Z)$ by EXORing or another suitable combination of several stored random numbers Z and function values F(Z) whenever said values are required. Random numbers Z can be selected for EXORing from the set of stored random numbers Z at random.

In a further embodiment, there is no storage of random numbers Z and function values $f(Z)$ since they are generated by means of suitable generators whenever required. It is important that the generator or generators do not generate function values $f(Z)$ by applying linear function $f$ to random number Z but that pairs of random numbers Z and function values $f(Z)$ be generated in another way since random number Z might otherwise be spied out by interception of the application of function $f$ to random number Z and further secret data determined with the aid of this information.

According to the invention, basically all security-relevant data, for example keys, can be falsified with the aid of further data, such as random numbers, and then be supplied to processing. This achieves the result that an attacker spying out said processing can only determine worthless data since they are falsified. At the end of processing the falsification is undone.

Figure 5:
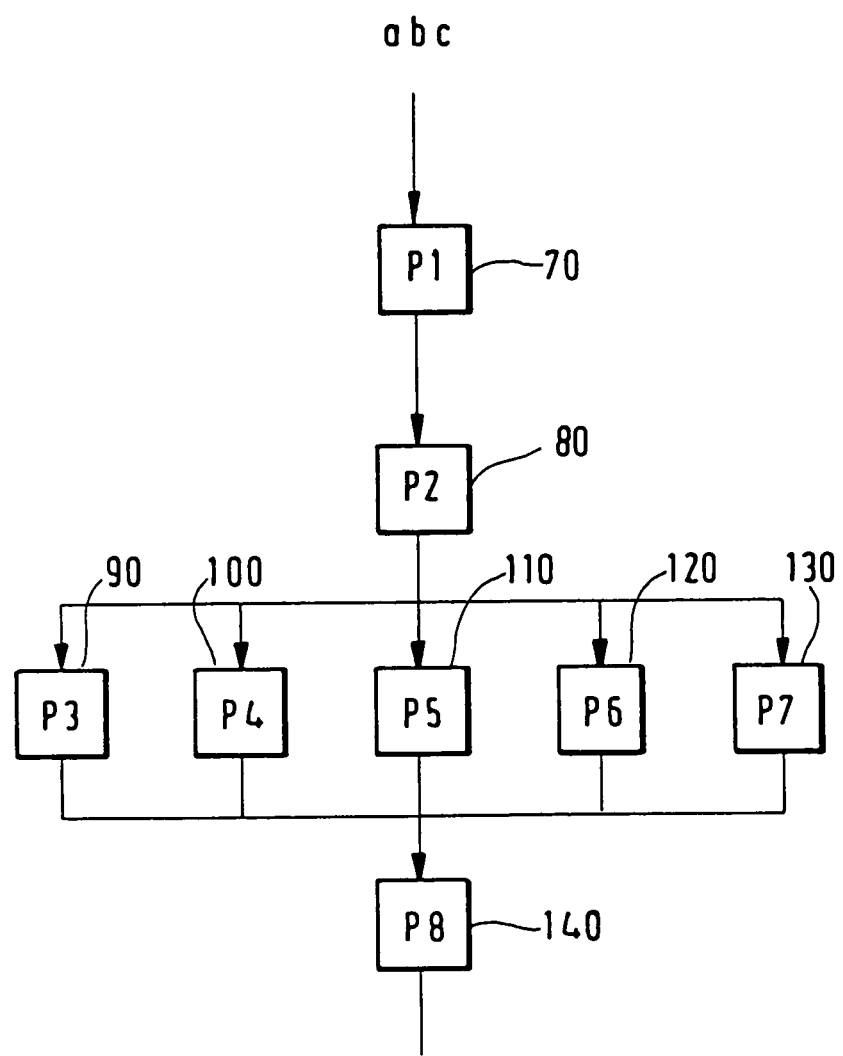
FIG. 5 shows a schematic representation of the sequence in the execution of some operations by the smart card.

FIG. 5 shows a schematic representation of the sequence during execution of some operations by the smart card. FIG. 5 shows in particular which operations must necessarily be executed sequentially by smart card 1 since they depend on each other, and which operations can basically be executed in parallel and thus in any order. In this connection FIG. 5 shows part of a program run of smart card 1 in which data abc are processed. All operations that have to be executed sequentially are shown sequentially in FIG. 5. All operations not requiring a special order of execution are disposed in parallel.

Processing of data abc begins with operation P1 shown in the form of block 70. The block is followed sequentially by block 80 representing operation P2. FIG. 5 thus indicates that the processing order of operations P1 and P2 cannot be interchanged, i.e. is obligatory. After block 80 the diagram shown in FIG. 5 branches into five blocks 90, 100, 110, 120, 130 representing operations P3, P4, P5, P6 and P7. It results that blocks P3, P4, P5, P6 and P7 can be executed simultaneously and thus also executed in any order. According to the invention the execution order of operations P3, P4, P5, P6, P7 is varied in each run, i.e. it is not foreseeable for an attacker which of said operations follows operation P2, which operations are performed after that, etc. Variation of the order can be effected either according to a fixed pattern or, better still, randomly or in accordance with input data by fixing by means of a random number or by the input data which of operations P3, P4, P5, P6 and P7 is executed next. This possibly random variation of the execution of the individual operations makes it difficult to spy out the data processed with the operations. When all operations P3, P4, P5, P6 and P7 are executed, operation P8 necessarily follows whose processing order is not variable. Operation P8 is shown by block 140. Operation P8 can be followed by further operations whose order is either variable or fixed, which are not shown in FIG. 5.

The invention can be used for example for the execution of encryption algorithms which frequently contain similar operations whose processing order is variable. The processing order can either be fixed before the first variable operation jointly for all operations interchangeable with said first operation, or the operation to be processed next can be determined before each variable operation from the set of remaining variable operations. In both cases one can use random numbers for fixing the processing order.

The invention claimed is:

1. A method for protecting secret data stored in a memory of a semiconductor chip of a data carrier, said secret data serving as input data for one or more operations executed on the semiconductor chip, the execution of the one or more operations causing signals detectable from outside of the data carrier, the signals being dependent on the one or more operations and on the input data for the one or more operations, said method comprising the steps of:

falsifying the input data by combination with auxiliary data (Z) before execution of the one or more operations ($f$) on the semiconductor chip, executing said one or more operations ($f$) on the semiconductor chip, retrieving an auxiliary function value ($f(Z)$) from said memory of said semiconductor chip of the data carrier, combining the output data determined by said executing of the one or more operations ($f$) with said auxiliary function value ($f(Z)$) in order to compensate for the falsification of the input data, wherein the auxiliary function value ($f(Z)$) was previously determined by execution of the one or more operations ($f$) with the auxiliary data (Z) as input data in safe surroundings and stored along with the auxiliary data (Z) in the memory of the semiconductor chip of the data carrier.

2. A method according to claim 1, wherein the combination with the auxiliary function values ($f(Z)$) for compensating the falsification is performed at the latest directly before execution of an operation (g) which is nonlinear with respect to the combination generating the falsification.

3. A method according to claim 1, wherein the auxiliary data (Z) are varied, the corresponding function values being stored in the memory of the data carrier.

4. A method according to claim 3, wherein new auxiliary values (Z) and new auxiliary function values ($f(Z)$) are generated by combining two or more existing auxiliary data (Z) and auxiliary function values ($f(Z)$).

5. A method according to claim 4, wherein the two or more existing auxiliary data (Z) and auxiliary function values ($f(Z)$) that are combined to generate the new auxiliary values (Z) and new auxiliary function values ($f(Z)$) are each selected randomly.

6. A method according to claim 1, wherein pairs of auxiliary data (Z) and auxiliary function values ($f(Z)$) are generated by a generator without the operation ($f(Z)$) being applied to the auxiliary data (Z).

7. A method according to claim 1, wherein the auxiliary data (Z) are a random number.

8. A method according to claim 1, wherein the output data and the auxiliary function value are combined by an XOR operation.

9. A method according to claim 1, wherein the operations are key permutations or permutations of other secret data.

* * * * *